(12) United States Patent
Leherbauer

(10) Patent No.: US 6,928,637 B2
(45) Date of Patent: Aug. 9, 2005

(54) VERSION CONTROL ADAPTER INTERFACE TO SUPPORT INTEGRATION OF MULTIPLE VENDORS INTEGRATED DEVELOPMENT ENVIRONMENTS (IDES)

(75) Inventor: Anton Leherbauer, Salzburg (AT)

(73) Assignee: Wind River Systems, Inc., Alameda, CA (US)

( * ) Notice: Subject to any disclaimer, the term of this patent is extended or adjusted under 35 U.S.C. 154(b) by 686 days.

(21) Appl. No.: 09/928,143

(22) Filed: Aug. 10, 2001

(65) Prior Publication Data

US 2003/0033590 A1 Feb. 13, 2003

(51) Int. Cl.[7] ................................. G06F 9/44
(52) U.S. Cl. ..................................... 717/122
(58) Field of Search ................ 717/170, 122

(56) References Cited

U.S. PATENT DOCUMENTS

| | | | | |
|---|---|---|---|---|
| 6,003,042 A | * | 12/1999 | Melahn | 707/203 |
| 6,112,024 A | * | 8/2000 | Almond et al. | 717/122 |
| 6,209,128 B1 | * | 3/2001 | Gerard et al. | 717/108 |
| 6,223,343 B1 | * | 4/2001 | Hopwood et al. | 717/101 |
| 6,223,344 B1 | * | 4/2001 | Gerard et al. | 717/170 |
| 6,233,730 B1 | * | 5/2001 | Todd et al. | 717/108 |
| 6,272,678 B1 | * | 8/2001 | Imachi et al. | 717/122 |
| 6,385,767 B1 | * | 5/2002 | Ziebell | 717/170 |
| 6,385,768 B1 | * | 5/2002 | Ziebell | 717/121 |
| 6,519,767 B1 | * | 2/2003 | Carter et al. | 717/140 |
| 6,553,563 B2 | * | 4/2003 | Ambrose et al. | 717/116 |

OTHER PUBLICATIONS

"Web Management with Microsoft Visual SourceSafe 5.0" Steven Banick et al. Que Corporation, 1997, Chapters I–V.*
"Clearcase Concepts Manual", Release 2.0, ATRIA, 1994, pp. 1–135.*
"INFO: Error Messages from Analyze Tool Of Visual SourceSafe", Microsoft Online Support, Sep. 7, 1999, 13 pages.*

* cited by examiner

*Primary Examiner*—Todd Ingberg
(74) *Attorney, Agent, or Firm*—Davidson, Davidson & Kappel, LLC

(57) ABSTRACT

A method for integrating a version control tool into an integrated development environment includes receiving a version control command, creating an object using the integrated development environment, accessing the object using a version control adapter, and communicating the information from the version control adapter to the version control tool. The object includes at least command information corresponding to the version control command. A software system for carrying out this method is also provided.

33 Claims, 3 Drawing Sheets

VERSION CONTROL ADAPTER INTERFACE TO SUPPORT INTEGRATION OF MULTIPLE VENDORS INTEGRATED DEVELOPMENT ENVIRONMENTS (IDES)

BACKGROUND INFORMATION

As software applications have become increasingly complex, software development tools have been created to assist in the development of such applications. One such development tool, known as an integrated development environment ("IDE"), can assist the developer in understanding the structure, the dependencies, and the flow of complex applications. Examples of IDEs include Tornado® and SNiFF+®, both available from Wind River Systems, Inc., as well as Visual C++®, available from Microsoft, C-Forge® available from CodeForge, VisualAge®, available from IBM, Jbuilder®, available from Borland, and SlickEdit®, available from MicroEdge.

Software applications generally consist of many different files of source code that are then "built" together into a single application. Thus, development of software applications often involves developing these distinct source code files and revising those files over time. With complex software applications involving a high number of files, or in software development projects using multiple team members—or multiple teams—controlling access to those files and managing their development can be a very elaborate and complicated task.

Several version control tools have been developed to assist the software developer in controlling and managing revision information for each source code file. Version control is the process of managing and administering file revisions. Examples of version control tools include: Revision Control System ("RCS"), an open-source tool under the GNU public license; Clear Case, available from Rational Software; Concurrent Versions System ("CVS"), an open-source network system; PVCS available from Intersolv; and Visual Source Safe available from Microsoft. These version control tools help to manage multiple revisions of source code files by keeping a complete history of changes performed to the files. They allow the user to track changes made to the files and to return to a previous revision of a file. They may also keep track of who performed the revisions and when, and can "lock" a file to prevent two users from revising the file simultaneously. Typically, files are located in a repository that is directly accessed by the version control tool. The file may be "checked out" of the repository by a developer, and changes may then be made to the file before it is checked back in. While the file is checked out in a locked state, other members of the development team may not make changes to it. When the file is checked back in it becomes accessible again to other members of the team, and the version control tool helps manage information about who checked out the document, when, and what changes were made. The tool may allow for the developer to save comments describing his changes and may assign a new name or version number to the file. Most of the version control tools offer these basic features in addition to other more advanced features.

Most IDEs in use today include some type of version control functionality coded into the IDE itself. Alternatively, some IDEs have been designed to function together with one specific version control tool. In those cases an adapter program provides an interface between the IDE and the separately coded version control tool. At least one IDE (SNiFF+® version 3.0, available from Wind River) is compatible with several different version control tools. In SNiFF+® version 3.0, the communication between the IDE and the version control tool is accomplished using various version control adapters, one for each version control tool supported by the IDE. Each version control adapter used with SNiFF+® version 3.0 includes scripts that map the version control commands available in the SNiFF+® menus with the corresponding version control commands of the version control tool to which it is adapted. The user dialogues, graphic user interface, and many of the version control and configuration management functions are performed by the IDE program itself. The version control adapters are relatively simple script files and are unable to make any but the simplest of decisions. Instead, the version control adapters act merely to dispatch commands and information between the IDE to the version control tool.

The SNiFF+® version 3.0 IDE program offered more choice to developers than existing IDEs about which version control tool to use. However, because it performed most of the version control and configuration management functions itself, it was relatively inflexible in its adaptability with the different version control tools. For example, SNiFF+® version 3.0 was unable to take advantage of version control tools it did not support, and was unable to take advantage of features of the version control tools that it did support where the features differed from, or were not taken into account by, the hard-coded version control features of the IDE. In addition, because much of the version control functionality was hard-coded into the SNiFF+® version 3.0 IDE itself, changes in the functionality of later-developed version control tools could not be taken into account by the IDE. Moreover, the SNiFF+® version 3.0 IDE was incapable of properly handling many exceptional conditions, such as error messages, that were generated by the version control tools.

SUMMARY

In a first embodiment, the present invention provides a method for integrating a version control tool into an IDE. The method includes receiving a version control command, creating an object using the IDE, the object including command information corresponding to the version control command, accessing the object using a version control adapter, and communicating the information from the version control adapter to the version control tool.

In a second embodiment, the present invention provides a software system. The software system includes an object including command information corresponding to a version control command, an integrated development environment including a configuration management service for creating the object, a version control tool, and a version control adapter capable of accessing the object and communicating the information to the version control tool.

In a third embodiment, the present invention provides a computer readable medium having stored thereon computer executable process steps operative to perform a method for integrating a version control tool into an integrated development environment. The process steps include receiving a version control command, creating an object using the integrated development environment, the object including command information corresponding to the version control command, accessing the object using a version control adapter, and communicating the command information from the version control adapter to the version control tool.

DETAILED DESCRIPTION

Figure 1:
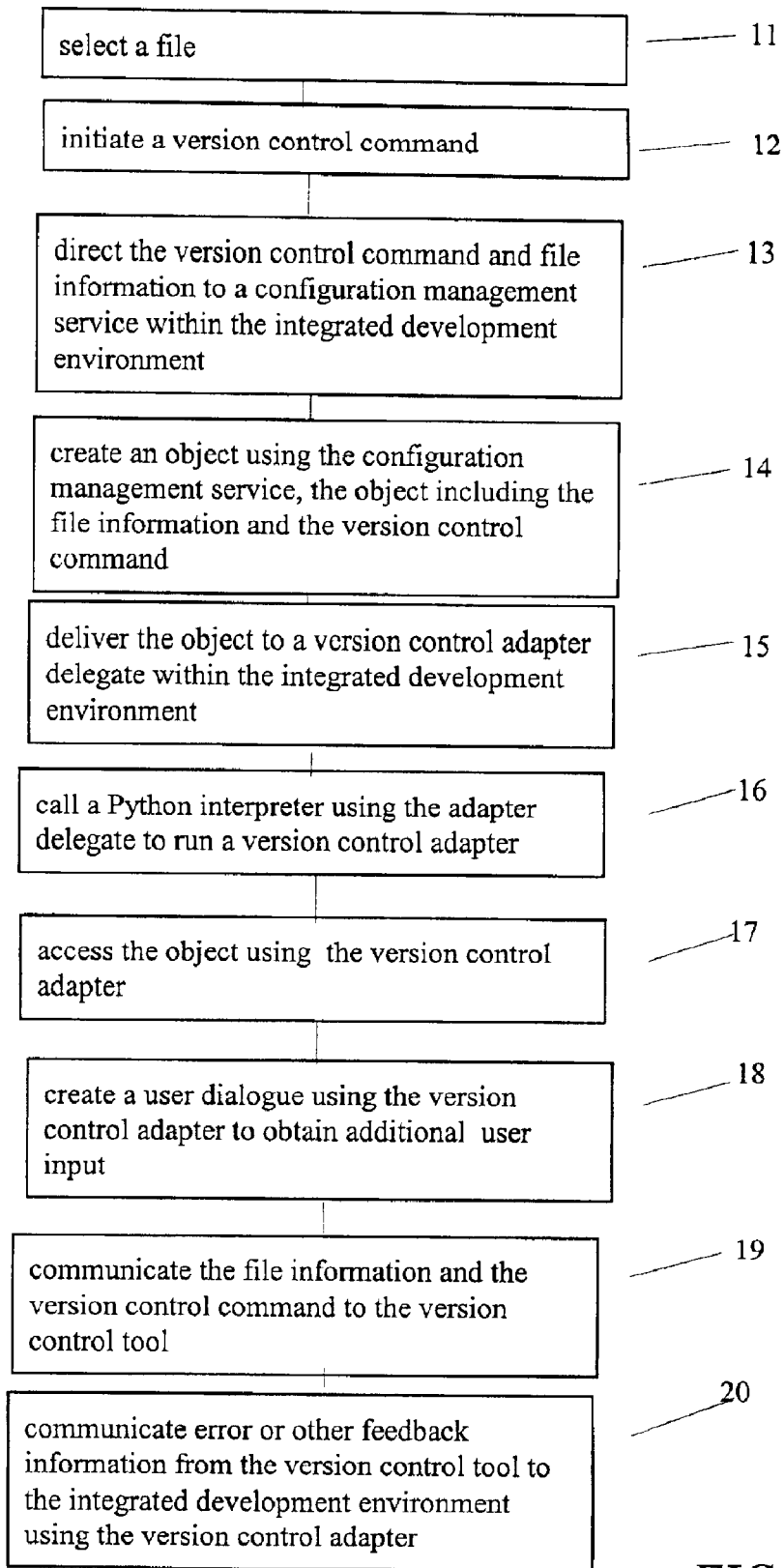
FIG. 1 shows a flow chart of a first method for integrating a version control tool into an IDE.

As described above, the present invention provides a method for integrating a version control tool into an IDE. The method includes receiving a version control command, creating an object using the IDE, accessing the object using a version control adapter, and communicating command information contained by the object corresponding to the version control command from the version control adapter to the version control tool.

The method may also include the step of receiving an indication of a file associated with the version control command. The object may be created to further include file information corresponding to the selected file, such as, for example, the file name and file path name, or the working environment for the file and configuration specification.

The method may also include implementing the version control command using the version control tool. The version control adapter is preferably written in an interpreted object oriented programming language such as Python, and the IDE is preferably also written in an object-oriented programming language such as C++.

The version control adapter may provide a dialogue for obtaining an input from a user, and may communicate this information from the version control adapter to the version control tool. The version control tool, may, under exceptional conditions for example, generate errors while implementing the version control command. In this case, the version control adapter may generate an error dialogue for obtaining an error response input from the user. The version control adapter may communicate the error response input directly to the version control tool without using the IDE and without communicating the error response to the IDE. The version control adapter may communicate various kinds of information from the version control tool to the IDE. The information may include information regarding permissions or content of a file, and any changes that have occurred to the permissions or content; information regarding a current revision number of a file; whether a revision is locked and by whom; as well as informative, warning, or error messages.

If the version control adapter is written in a programming language other than that of the object, the version control adapter may access the object using a wrapper object. A wrapper object is used to form a bridge between incompatible environments so that data can be exchanged. The wrapper object may be part of the IDE and be written in C++. The version control adapter may reside outside of the IDE as a separate program.

The present invention also provides a software system that includes an IDE, a version control adapter and a version control tool. The IDE includes a configuration management service for creating an object containing information corresponding to a version control command and the version control adapter is capable of accessing the object (either directly or using an intermediate wrapper object). The version control adapter communicates the information obtained from the object to the version control tool.

Both the IDE and the version control adapter are written using an object oriented programming language. The IDE is preferably written in C++ and the version control adapter is preferably written in Python.

Referring to FIG. 1, illustrating one embodiment according to the present invention, the user first selects a file (step 11). This may be done, for example, by highlighting the file name in a graphic user interface using a mouse. Next, the user selects a version control command (step 12). The user may select the version control command, for example, from pull-down menus. Examples of version control commands include checkout, checkin, lock, delete, etc. Once the version control command is initiated, the IDE directs the command (step 13) together with information corresponding to the file to a configuration management service within the IDE. The IDE may be SNiFF+® available from Wind River, for example. The configuration management service creates an object including the file information (such as the file name, path name, working environment, and configuration specification), and information corresponding to the selected version control command (such as checkout, checkin, etc.) (step 14). The configuration management service then delivers the object (step 15) within the IDE to the appropriate version control adapter delegate. As described above, there may be several version control adapters used together with the IDE, one for each version control tool supported by the IDE. Each type of version control adapter, the type being mainly determined by its programming language, has a version control adapter delegate within the IDE. So for example, if all of the version control adapters for the IDE are written in Python language, there will be only one version control adapter delegate. At about the same time as delivering the object, a Python interpreter is called using the version control adapter delegate to run the version control adapter (step 16). This step may be altered or omitted in those implementations that do not use Python.

The version control adapter then accesses the object (step 17). This may be done using a wrapper object written in C++ that is part of the IDE itself. It is only after the version control adapter accesses the object that the information is substantively processed. Up until that point the IDE has acted to convey the information about the files and version control command selected. The IDE does not know or concern itself with which command has been selected or the meaning of that command. Next, the version control adapter begins to process the version control command (step 18), creating a dialogue with the user to obtain additional input information if necessary. For example, the version control adapter may ask the user to select whether the document should be locked during the period that it is being checked out. The document may be locked exclusively so that only that user can modify the revision, or it may be locked concurrently so that more than one user may modify the same revision. The dialogue may also enable the user to enter comments such as a description of the modifications, or the name of the revision. The dialogue and the type of user input obtained depends upon the command and the underlying version control tool. For example, if the checkout command is selected when using the RCS version control tool, the user can select which revision of the file to check out (or to accept the default revision). The user can also determine whether to create an exclusive lock on the revision (so that no other users may revise the file during the checkout period), or to checkout the file without locking it. The user may also choose to checkout the file in read only mode without locking it. A comment field may be used to enter additional descriptive information of the changes made to the file. A checkbox may be made available to the user to check if any changes were made to the file. If, during a check in, a file is detected to contain no changes to its previous revision, the adapter may create a dialogue to provide the user with options on how to proceed. For example, the user may be offered the choice of checking the file in anyway or removing the lock without checking in the file, or to skip the check in command.

Once the version control adapter gets the additional input information using the dialogue, it communicates all of the information from the object and the dialogue to the version control tool so that the version control command can be properly implemented by the version control tool (step 19). The version control tool communicates feedback information, such as error information, back to the version control adapter (step 20). The version control adapter can then provide an interface with the user (such as through dialogue windows) to communicate the information and obtain any further feedback information as necessary.

Figure 2:
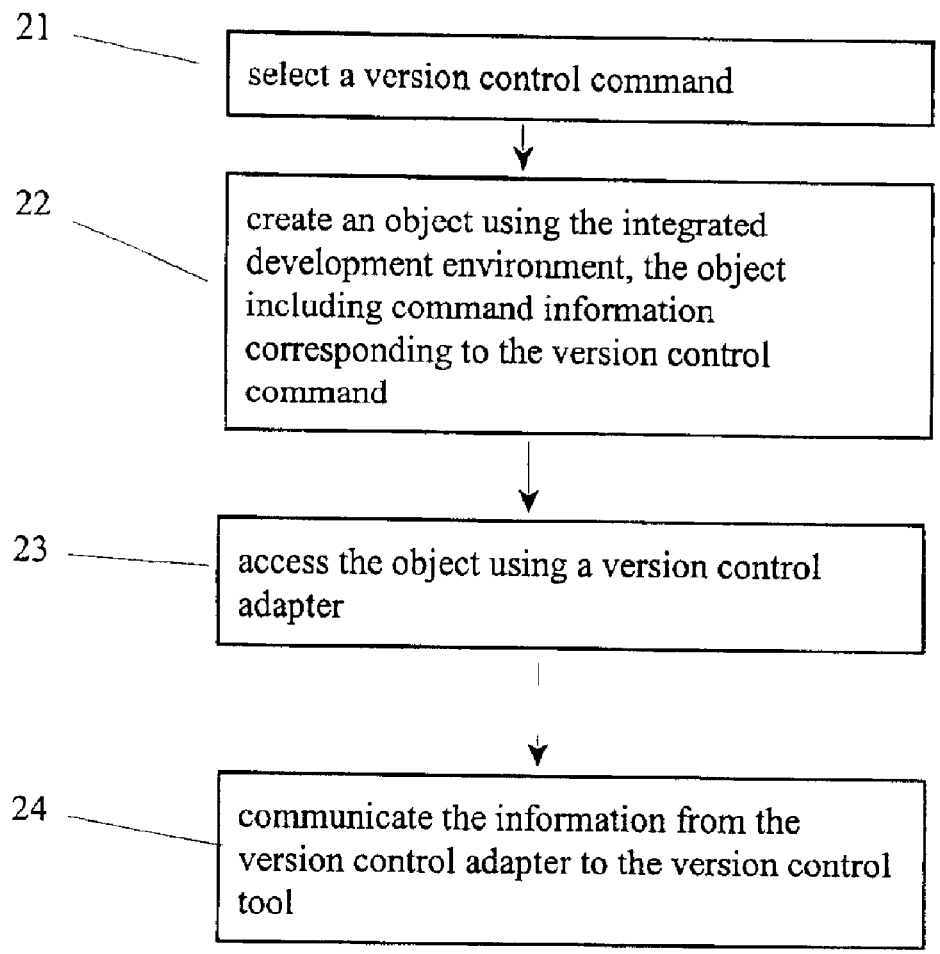
FIG. 2 shows a flow chart of a second method for integrating a version control tool into an IDE.

Referring to FIG. 2, in another embodiment according to the present invention, the user selects a version control command (step 21). Next, the IDE is used to create an object, the object including at least the command information corresponding to the version control command (step 22). The object, may include additional information about the file, the user, etc. The object is then accessed using the appropriate version control adapter (step 23). As described above with respect to the embodiment of FIG. 1, the version control adapter may be run by a Python interpreter that is called by the appropriate version control adapter delegate in the IDE. The information corresponding to the version control command is then communicated from the version control adapter to the version control tool (step 24).

A difference between the methods for integrating a version control tool into an IDE according to the present invention and the method used in SNiFF+® version 3.0, is the amount of functionality that is hard-coded into the IDE itself. According to the present invention, the IDE takes the information corresponding to the version control command that has selected by the user (for example, via a menu command) together with file information corresponding to the selected file, and creates an object that includes that information. It does not evaluate, or otherwise use the information, except to direct it to the appropriate place. It makes no difference to the IDE, for example, what specific version control command has been chosen, since it handles all selected version control commands in the same way. By contrast, in SNiFF+® version 3.0, the IDE performed much of the version control functionality itself. For example, the IDE first determined which version control command had been selected and performed decision-making, dialoguing with the user, and other functions according to which version control command had been selected. These relatively complex functions were hard-coded in C++ into the IDE itself and therefore could not be modified without modifying and recompiling the source code, and a version control tool incompatible with the functionality of the IDE could not be used. For example, the checkin command of a version control tool (for example, the Perforce® version control tool) may require that all files of a change-set be checked in at once. However, the version control algorithm hard-coded into SNiFF+® version 3.0 could not perform the checkin command in this manner. Furthermore, additional features provided by certain version control tools, beyond the standard features common among all of them, could not be utilized in SNiFF+® version 3.0, because the dialogues could not be customized to suit each individual version control tool. According to the present invention, these functions, dialogues and decision making are no longer hard-coded into the IDE. Instead, they are performed by the version control adapter which has been tailored to adapt with a specific version control tool.

Figure 3:
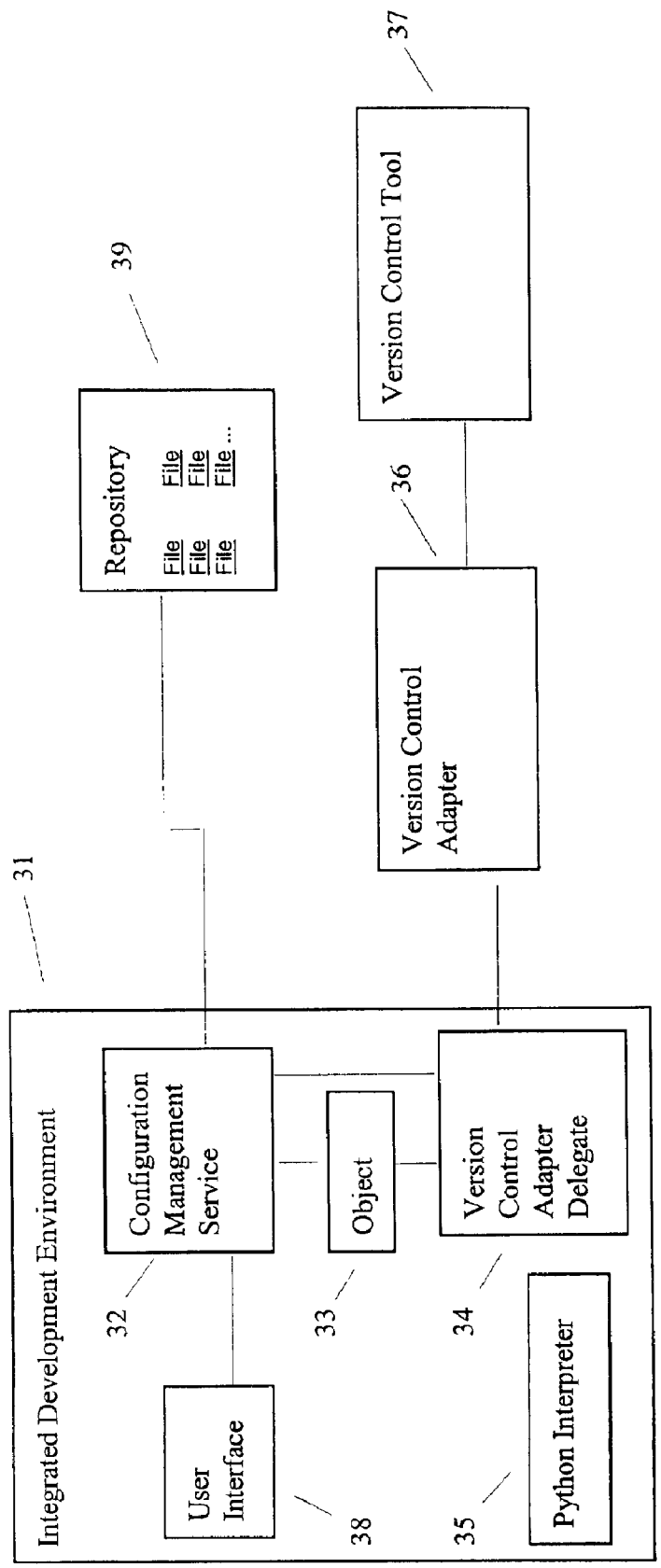
FIG. 3 shows a schematic block diagram of a software system according to the present invention.

FIG. 3 illustrates an embodiment of a software system according to the present invention. As shown in FIG. 3, IDE 31 includes configuration management service 32, version control adapter delegate 34, and Python interpreter 35. IDE 31 provides a user interface 38, for software developers, and includes tools for source code browsing, integrated text editing, project and code management, software building, debugging and code sharing (not shown). Configuration management service 32 provides version control and configuration management services to several tools of the IDE. For example, it can retrieve a specific revision of a file to be used by a tool of the IDE to show changes between revisions. Configuration management service 32 implements an abstract configuration management facility that is substantially independent of any underlying version control tool that may be used.

Repository 39 may be provided to contain various files of a software system under version control, as well as information about the "version tree" for each file. Version control adapter 36 implements a minimal set of commands which are used to retrieve information from or modify the repository. The configuration management service uses information about the version tree of a file to select a specific version of the tree according to a configuration specification. Applying the configuration specification to a set of files defining the software system creates a configuration of the software. Such a configuration can be frozen in the configuration management tool of the IDE, and a name is assigned to the configuration. In this way, the software system can later be restored to the configuration, or the configuration can be used as a baseline for diverging modifications (branches).

When a user selects a version control command associated with a file or files, the IDE directs the appropriate information to configuration management service 32. Configuration management service 32 creates object 33 containing this information. The object may also contain the name of the version control adapter, the directory of the repository in which the file resides, the directory of the workspace, the default configuration specification, and properties specific to the version control adapter. In addition to acting as a container for static information, the object may also provide dynamic access to configuration management service functions. For example, the object may apply a configuration specification to a file version tree resulting in a revision number. The object may also provide an interface for returning error codes, messages, simple return values such as text, and/or version trees. The configuration management service 32 also determines which version control tool has been designated as active at the time and delivers object 33 to the appropriate version control adapter delegate 34. Version control adapter delegate 34 then calls Python interpreter 35 to run version control adapter 36. As version control adapter 36 runs, it accesses object 33 (using a wrapper object if necessary), and communicates the information to version control tool 37. The version control tool implements the version control command (for example, checkout of a file from a repository). Version control tool 37 may send feedback information to version control adapter 36, including, for example any error messages in the case of an exceptional condition. The version control tool is usually an external program that is executed by the version control adapter. A process terminates by returning an exit code indicating success or an error condition. In addition, the version control tool 37 might include a textual output which is communicated to the version control adapter. Error conditions are usually handled by the adapter by showing a dialogue containing the output produced by the process. The user may then be given the choice to either cancel the operation or to continue with the next file. Python interpreter 35 may be built into IDE 31. Version control adapter 36 may reside in an installation area of the IDE.

Each of the embodiments described above may be implemented as computer instructions on a computer readable medium, which can be distributed for installation on appropriate computer environments or used for execution on such environments.

The present invention has been described herein with reference to specific exemplary embodiments thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. A method executing on a computer readable medium for integrating a version control tool into an integrated development environment, the method comprising:
   receiving a version control command;
   creating an object using the integrated development environment, the object including command information corresponding to the version control command;
   accessing the object using a version control adapter; and
   communicating the command information from the version control adapter to the version control tool.

2. The method as recited in claim 1 further comprising receiving an indication of a file associated with the version control command before the receiving of the version control command and wherein the creating of the object is performed so as to further include file information corresponding to the file.

3. The method as recited in claim 1 further comprising receiving an indication of a file associated with the version control command after the receiving of the version control command and wherein the creating of the object is performed so as to further include file information corresponding to the file.

4. The method as recited in claim 3 wherein the file information includes a file name and a path name of the file.

5. The method as recited in claim 4 wherein the file information further includes a working environment and a configuration specification of the file.

6. The method as recited in claim 1 further comprising implementing the version control command using the version control tool.

7. The method as recited in claim 1 wherein the version control adapter is written in a Python programming language.

8. The method as recited in claim 1 wherein the integrated development environment is written in a C++ programming language.

9. The method as recited in claim 1 further comprising providing a dialogue using the version control adapter so as to obtain a user input from a user.

10. The method as recited in claim 9 wherein the communicating the information from the version control adapter to the version control tool is performed so as to communicate the user input from the version control adapter to the version control tool.

11. A method executing on a computer readable medium for integrating a version control tool into an integrated development environment, the method comprising:
    receiving a version control command;
    creating an object using the integrated development environment, the object including command information corresponding to the version control command;
    accessing the object using a version control adapter;
    communicating the command information from the version control adapter to the version control tool;
    implementing the version control command using the version control tool, the version control adapter receiving errors generated by the version control tool while implementing the version control command.

12. The method as recited in claim 11 further comprising generating an error dialogue using the version control adapter so as to obtain an error response input.

13. The method as recited in claim 12 further comprising communicating the error response input directly to the version control tool using the version control adapter and without using the integrated development environment.

14. The method as recited in claim 1 further comprising communicating information from the version control tool to the integrated development environment using the version control adapter.

15. The method as recited in claim 1 wherein the accessing of the object is performed using a wrapper object.

16. The method as recited in claim 1 wherein the version control adapter resides outside of the integrated development environment.

17. A software system executing on a computer readable medium comprising:
    an object including command information corresponding to a version control command;
    an integrated development environment including a configuration management service configured to create the object; and
    a version control adapter capable of accessing the object and communicating the command information to a version control tool.

18. The software system as recited in claim 17 wherein both the integrated development system and the version control adapter are written using an object oriented programming language.

19. The software system as recited in claim 18 wherein the integrated development environment is written in a C++ programming language and the version control adapter is written in a Python programming language.

20. The software system as recited in claim 17 wherein the object further includes file information corresponding to a file selected by a user.

21. The software system as recited in claim 20 wherein the file information includes a file name and a path name of the file.

22. The software system as recited in claim 21 wherein the file information further includes a working environment and a configuration specification of the file.

23. The software system as recited in claim 17 wherein the version control adapter is written in a Python programming language.

24. The software system as recited in claim 17 wherein the integrated development environment is written in a C++ programming language.

25. The software system as recited in claim 17 wherein the version control adapter is capable of being used to provide a dialogue so as to obtain a user input from a user.

26. The software system as recited in claim 25 wherein the version control adapter is capable of communicating the user input to the version control tool.

27. A software system executing on a computer readable medium comprising:

an object including command information corresponding to a version control command;

an integrated development environment including a configuration management service configured to create the object; and a version control adapter capable of accessing the object and communicating the command information to a version control tool, wherein the version control adapter is configured to receive an error from the version control tool.

28. The software system as recited in claim 27 wherein the version control adapter is capable of generating an error dialogue in response to the error to obtain an error response input.

29. The software system as recited in claim 28 wherein the version control adapter is capable of communicating the error response input directly to the version control tool without using the integrated development environment.

30. The software system as recited in claim 17 wherein the version control adapter is capable of communicating information from the version control tool to the integrated development environment.

31. The software system as recited in claim 17 further comprising a wrapper object adapted for use by the version control tool for accessing the object.

32. The software system as recited in claim 17 wherein the version control adapter resides outside of the integrated development environment.

33. A computer readable medium having stored thereon computer executable process steps operative to perform a method for integrating a version control tool into an integrated development environment, the process steps comprising:

receiving a version control command;

creating an object using the integrated development environment, the object including command information corresponding to the version control command;

accessing the object using a version control adapter; and communicating the command information from the version control adapter to the version control tool.

* * * * *